(12) United States Patent
Schramm et al.

(10) Patent No.: US 9,308,898 B2
(45) Date of Patent: Apr. 12, 2016

(54) HAND BRAKE DEVICE FOR A VEHICLE

(71) Applicant: GM GLOBAL TECHNOLOGY OPERATIONS LLC, Detroit, MI (US)

(72) Inventors: Thomas Schramm, Mainz (DE);
Winfried Palaschinski, Idstein (DE);
Axel Luenenbuerger, Eppstein (DE);
Klaus Duckwitz, Bechtolsheim (DE);
Andreas Holl, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/475,160

(22) Filed: Sep. 2, 2014

(65) Prior Publication Data

US 2015/0060217 A1    Mar. 5, 2015

(30) Foreign Application Priority Data

Sep. 2, 2013    (DE) .................... 10 2013 014 571

(51) Int. Cl.
| | |
|---|---|
| *B60T 7/10* | (2006.01) |
| *B60T 7/08* | (2006.01) |
| *G05G 5/06* | (2006.01) |
| *G05G 1/04* | (2006.01) |

(52) U.S. Cl.
CPC .............. *B60T 7/085* (2013.01); *B60T 7/102* (2013.01); *B60T 7/104* (2013.01); *G05G 5/06* (2013.01); *B60T 7/107* (2013.01); *G05G 1/04* (2013.01)

(58) Field of Classification Search
CPC .............. B05G 5/06; B05G 5/16; B05G 5/22; B05G 1/04; B60T 7/104; B60T 7/102; B60T 7/107
USPC .......................................................... 188/158
See application file for complete search history.

(56) References Cited

U.S. PATENT DOCUMENTS

| | | | | |
|---|---|---|---|---|
| 3,383,943 A | * | 5/1968 | Piber ....................... | B23B 45/02 173/170 |
| 4,097,703 A | * | 6/1978 | Houser ................... | H01H 9/061 200/321 |
| RE30,273 E | * | 5/1980 | Grebner ................ | H01H 27/06 200/321 |
| 4,629,043 A | * | 12/1986 | Matsuo .................. | B60T 7/107 188/2 D |
| 5,486,669 A | * | 1/1996 | Oshgan ................ | H01H 9/0066 200/553 |
| 6,513,632 B2 | * | 2/2003 | Peter ..................... | B60T 13/746 188/156 |
| 6,907,965 B2 | * | 6/2005 | Peter ....................... | B60T 7/107 188/156 |
| 7,516,822 B2 | * | 4/2009 | Kramer .................. | B60T 7/107 188/156 |

(Continued)

FOREIGN PATENT DOCUMENTS

| | | |
|---|---|---|
| DE | 4205588 A1 | 8/1993 |
| DE | 10315233 A1 | 11/2004 |

(Continued)

OTHER PUBLICATIONS

German Search Report conducted Aug. 20, 2014 in DE 102013014571.6.

*Primary Examiner* — Thomas Irvin
(74) *Attorney, Agent, or Firm* — Ingrassia Fisher & Lorenz PC

(57) ABSTRACT

A hand brake device for a vehicle includes an electric actuator for activating a brake and an operating element that can be moved between a brake position and release position. A control unit triggers the actuator according to the position of the operating element. A locking device for locking the operating element in the brake position is controlled by the control unit.

16 Claims, 1 Drawing Sheet

(56) References Cited

U.S. PATENT DOCUMENTS

| | | | |
|---|---|---|---|
| 8,704,118 B2 * | 4/2014 | Konno | H01H 23/162 200/339 |
| 8,789,439 B2 * | 7/2014 | Tovar | B60T 7/085 74/473.1 |
| 2005/0077118 A1 * | 4/2005 | Kubina | B60T 7/104 188/2 D |
| 2006/0175157 A1 * | 8/2006 | Villa | B60T 7/104 188/196 B |
| 2013/0213787 A1 * | 8/2013 | Laicher | H01H 23/003 200/557 |

FOREIGN PATENT DOCUMENTS

| | | |
|---|---|---|
| DE | 60131064 T2 | 8/2008 |
| EP | 1621953 B1 | 2/2006 |
| EP | 1655190 A1 | 5/2006 |

* cited by examiner

HAND BRAKE DEVICE FOR A VEHICLE

CROSS REFERENCE TO RELATED APPLICATION

This application claims priority to German Patent Application No. 102013014571.6 filed Sep. 2, 2013 which is incorporated herein by reference in its entirety.

TECHNICAL FIELD

The technical field relates to a hand brake device for a vehicle, which encompasses an electric actuator for activating a brake, an operating element that can be moved between a brake position and release position, and a control unit for triggering the actuator according to the position of the operating element.

BACKGROUND

Such a hand brake device is known from EP 1 655 190 A1. While the brake is electrically activated in this conventional hand brake device, the operating element resembles the lever in a conventional, purely mechanical hand brake device. The hand brake exhibits a handle to be gripped by the user, and can be locked in a brake position by having a latch engage into a toothed rack. However, while the position of the brake lever in the conventional mechanical hand brake is clearly correlated with the status of the brake, i.e., tightened or released, and the user can read the status of the brake by the position of the lever, there is no such clear correlation for the hand brake device according to EP 1 655 190 A1. When a user pulls up the brake lever, he or she can lock it into the brake position, but if the onboard electrical system of the vehicle is turned off, the actuator cannot respond to lever activation and tighten the brake. In this circumstance, the position of the lever may give the driver the impression that the hand brake device has been activated, when in reality it has not.

SUMMARY

In accordance with the present disclosure a hand brake device for a vehicle is provided with a brake to be activated by an electric actuator, in which the status of the brake can be reliably read from the position of an operating element.

In an embodiment of the present disclosure, a hand brake device for a vehicle is disclosed with an electric actuator for activating a brake and an operating element that can be moved between a brake position and release position. A control unit triggers the actuator according to the position of the operating element by having the control unit control a locking device for locking the operating element in the brake position according to the position of the operating element. Since the control unit determines and knows the status of the actuator, it can easily ensure that the position of the operating element correlates with the status of the brake.

One way to ensure this correlation can be for the control unit to release the operating element locked in the brake position when the actuator has failed to tighten the brake. In particular, this allows it to lock the operating element right away once it has been shifted into the brake position by the driver. The driver can then let go of the operating element even if the actuator has not yet completely tightened the brake, and allow the control unit control the movement of the actuator until it reaches a position corresponding to the operating element position. If the brake has been successfully tightened, the operating element stays in the brake position, and if it has not, for example because the actuator fails to perform an envisaged positioning movement within a prescribed period of time, the operating element is again released, and can return to the release position.

As an alternative, it can be provided that the control unit locks the operating element in the brake position after the actuator has tightened the brake.

In order to ensure that the operating element returns to the release position quickly and reliably, a return element, in particular a return spring, can be provided that acts on the operating element in the direction of its release position.

In order to be able to easily release the brake, it should be possible to manually undo the operating element locked by the locking device. As depicted in EP 1 655 1990 A1, such a locking device can encompass a latch that interacts with a toothed rack. This type of latch can be engaged with the toothed rack via an electric actuator in order to lock the operating element in the brake position, and disengaged from the toothed rack by swiveling the operating element beyond the brake position.

In one preferred embodiment, the locking device encompasses a brake pad, which when locked frictionally abuts against the operating element. As a result, a user can release the brake just by overcoming the friction between the operating element and brake pad to move the latter back into its release position.

A user can determine if a brake was successfully tightened by whether the operating element, once released, remains in the brake position or returns to the release position. If the user lets go of the operating element before the actuator has had the time to tighten the brake, and the operating element returns to the release position, it makes sense for the actuator to cease tightening the brake, and move the latter back into the released position. The user must then activate the operating element again, and wait until such time as the actuator has successfully tightened the brake. So as not to lose time by letting go of the operating element too early, it can be provided that the control unit delivers a confirmation to the user once the actuator has tightened the brake. Such a confirmation can take the form of an optical or acoustic signal, but can also be a haptic type, wherein in particular the operating element can be moved by the locking process, and the user holding the operating element in the brake position can feel its movement. This type of haptic feedback can be provided without the need for any additional components, as explained below based upon exemplary embodiments.

The operating element can be a lever that can be swiveled around an axis between the brake position and release position. In such a lever, the movement by the operating element caused by the locking process can be in particular a translation, preferably transverse to the lever axis.

Since the force required to tighten the brake is applied by the actuator, and need not be exerted by the user, the lever of the hand brake device according to the present disclosure can be considerably smaller than a conventional hand brake lever. In particular, this makes it possible to embed the lever in a space-saving manner in a plate, especially in a dashboard, the wall of an interior lining of the passenger compartment or the like.

Because the lever exhibits a flank that is aligned with the plate in a selected brake position or release position, preferably in the release position, the respective other, misaligned position is easily and reliably detected, so that a user can smoothly read the status of the hand brake device. In particular, the lever can be mounted on a location inside the passenger compartment visible through a window of the vehicle, allowing the user to verify the status of the hand brake as needed, without having to open the vehicle.

In order to make the lever easier to handle, a trough can be molded into the plate, accommodating the lever in the aforementioned selected position and extending beyond an axial end of the lever, which enables the user to reach into the trough and pull out the lever. The width of the trough in the axial direction preferably does not exceed 4 cm, and is in practice dimensioned sufficiently to offer space for precisely one finger of the user.

The lever can be arranged on a center console or transmission tunnel of the vehicle. Since it requires significantly less space there than the lever of a conventional mechanical hand brake device, there can be space next to the lever for another operating element or a storage compartment, especially if the lever is eccentrically arranged on the center console or transmission tunnel.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
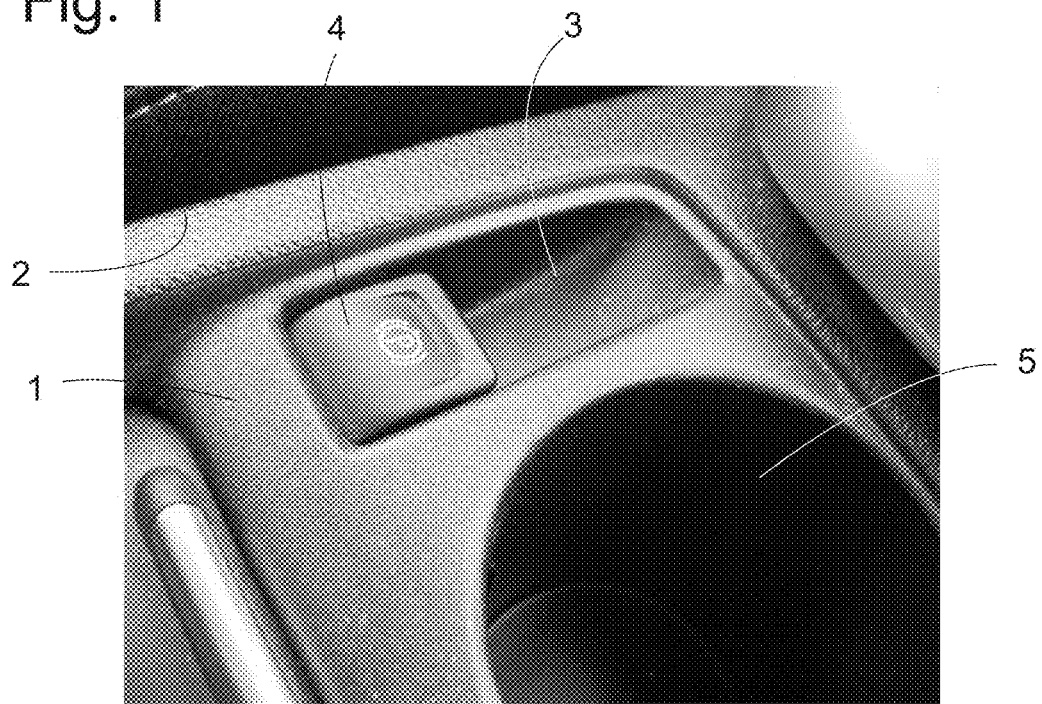
FIG. 1 is a view depicting the lever of a hand brake device according to the present disclosure, built into the central console of a vehicle.

FIG. 1 shows a perspective view of a cutout from the center console of an automobile. Molded into a plate 1 on the upper side of the center console next to an edge 2 of the latter adjacent to the driver's seat is a trough 3, whose width in the transverse direction of the vehicle is somewhat larger than that of a human finger, e.g., measuring 2 cm, and whose extension in the longitudinal direction corresponds to roughly the length of two finger digits, approx. 5 cm. A lever 4 is pivoted around an axis extending in the transverse direction of the vehicle (not shown on the figure) in a rearward area of the trough 3 relative to the longitudinal direction of the vehicle.

A larger depression 5 only partially visible on FIG. 1 is tightened in the plate 1 on the side of the trough 3 facing the passenger, e.g., which can be used as a beverage holder.

Figure 2:
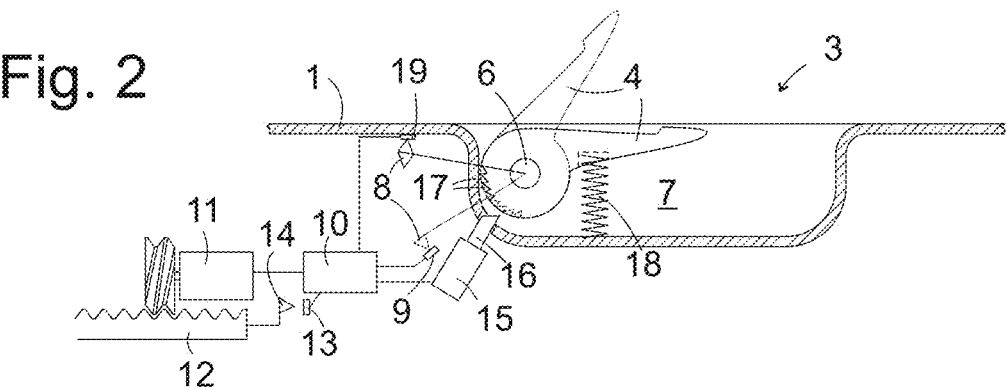
FIG. 2 is a schematic section through the lever and its environment.

FIG. 2 presents a schematic section through the lever 4 and its environment according to a first embodiment of the present disclosure. The lever 4 shown in FIG. 2 is depicted in two positions, one a release position denoted by a solid outline, and the other a brake position denoted by a dashed outline. An upper side of the lever 4 is aligned flush with the enveloping plate 1 in the release position. The swiveling axis of the lever 4 is established by the axle journals 6 protruding from either side of the lever 4, which are held in lateral walls 7 of the trough extending essentially parallel to the sectional plane.

An electrical contact 8 is coupled to one of these axle journals 6 below the plate 1. Together with a fixed contact 9, it forms an electrical switch that closes with the lever 4 in the brake position. The closing process is detected by a logic circuit 10, and prompts the latter to supply battery voltage to a first actuator, here an electric motor 11. The rotation of the electric motor 11 drives a toothed rod 12, which is coupled to a brake of the vehicle (not shown), and tightens it. Once the brake has reached a sufficiently tightened position, another switch formed by a fixed contact 13 and a contact 14 that can move with the toothed rod 12 closes, after which the logic circuit 10 stops supplying voltage to the electric motor 11, and outputs a switching pulse to a second actuator 15 for it to extend a latch 16.

In the extended position, the latch 16 engages into a tooth system of the lever 4. Since the deepest points of notches 17 in the tooth system and the tip of the latch 16 do not lie precisely opposite each other when extending the latch 16, the latch 16 in general exerts a torque on the lever 4 while moving into the notches 17 that can be felt by the user, and tells him or her that the brake is tightened, and that the lever 4 has been locked in the brake position. The lever 4 can now be released, and its position visibly indicates that the brake has been tightened.

As an alternative, the logic circuit 10 can already start extending the latch 16 as soon as the contacts 8, 9 touch each other, so as to already lock the lever 4 in the brake position while the electric motor 1 is in the process of displacing the toothed rod 12. As a result, the driver is given a chance to quickly release the lever 4 again even before the brake has actually been tightened. If the contacts 13, 14 fail to close within a prescribed period of time after the contacts 8, 9 have closed, the logic circuit 10 assumes from this that a malfunction has occurred, and retracts the latch 16 once again. Driven by the spring 18, the lever 4 thereupon returns to the release position, allowing the driver to see that the brake has not been tightened.

If the axle journals 6 of the lever 4 have been mounted in the walls 7 with a radial clearance, the latch 16 hitting the lever 4 can also cause a slight translation by the lever 4 perpendicular to its swiveling axis within the framework of this clearance that is perceptible to the user.

By contrast, if the driver lets go of the lever 4 before the latch 16 has been extended, a spring 18 drives the lever 4 back into the release position that is essentially flush with the surface of the plate 1, the contacts 8, 9 separate from each other, and the movable contact 8 reaches a second fixed contact 19 in the release position, after which the logic circuit 10 powers the electric motor 11 with the opposite rotational direction until the toothed rod 12 has reached a stop position (not depicted on the figure) in which the brake is completely released.

In the embodiment shown in FIG. 2, the user must pull the lever 4 up beyond the brake position to thereby force the latch 16 out of the notch 17 in order to again release the tightened brake. He or she can then let go of the lever 4, and the spring 18 pulls it back into the release position. The logic circuit 10 in turn responds to the contact between the contacts 8, 19 by powering the electric motor 11, so that it displaces the toothed rod 12 into the released position of the brake.

Figure 3:
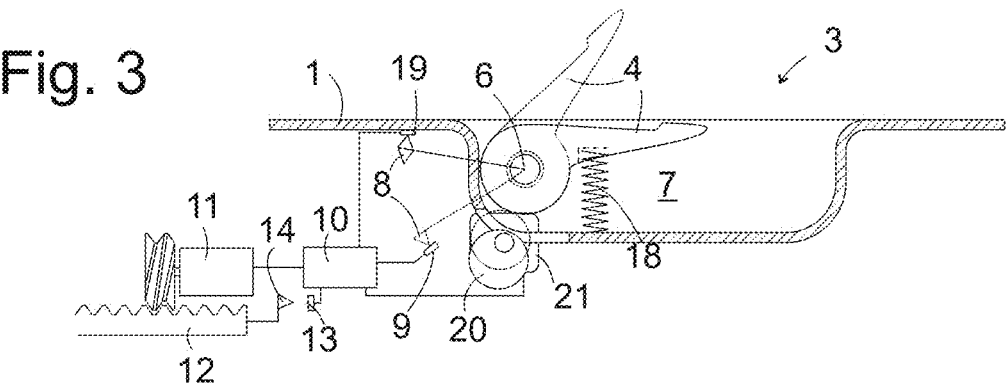
FIG. 3 is a section similar to FIG. 2 according to a second configuration.

The embodiment shown in FIG. 3 differs from the one illustrated in FIG. 2 essentially by the type of locking device used to lock the lever 4 in the brake position. While the latter includes the actuator 15, latch 16 and notches 17 of the lever 4 interacting therewith in the embodiment on FIG. 2, it also includes a friction body 20 with an allocated actuator 21 in the embodiment on FIG. 3. In the case being considered here, the actuator 21 is an electric motor, and the friction body 20 is a disk that is eccentrically mounted on the shaft of the electric motor, and can be turned by the latter into a position frictionally touching the lever 4, marked on FIG. 3 as a dashed outline. The rotatable friction body 20 could also be replaced by a friction body that can move radially to the axis of the lever like the latch 16, or by a tongue with two brake pads, which are moved axially toward the lever 4 to lock the lever 4, clamping the latter between them.

In this embodiment as well, the logic circuit 10 responds to a swiveling by the lever 4 into the brake position and a closing of the contacts 8, 9 by powering the motor 11 so as to tighten the brake. Once the brake has been tightened and the contacts 13, 14 have closed, the logic circuit 10 in a first variant activates the actuator 21 so as to press the friction body 20 against the lever 4. In the position depicted as a dashed outline, the friction body 20 blocks the lever 4 from turning counterclockwise.

In a second variant, the logic circuit 10 activates the actuator 21 as soon as the contacts 8, 9 touch each other, so as to thereby lock the lever 4, but undoes the lock if the contacts 13, 14 fail to touch each other within a prescribed period of time.

The following applies to both embodiments: When the user presses the lever 4 back into the release position, this also turns the friction body 20 away from the lever 4, and the diminished friction allows the spring 18 to pull back the lever 4 into the release position.

As described above with reference to FIG. 2, locking the lever 4 can cause a translation of the lever 4 perpendicular to its swiveling axis that is perceptible to the user within the framework of a clearance between the axle journal 6 and the openings in the wall 7 accommodating it. In addition, a marked torque in the direction of the swiveling axis can act on the lever 4.

Instead of discrete contacts 8, 9 or 13, 14 that each close in precisely one defined position of the lever 4 or toothed rod 11, a further development can also provide quantitative sensors for detecting a rotational angle of the lever 4 or the displacement of the toothed rod 12, and the logic circuit 10 can be set up to determine the position of the toothed rod 12 in which it regards the brake has having been successfully tightened and shuts off the electric motor 10 based on the acquired displacement of the lever 4. This allows the user to shorten the time needed to tighten the hand brake when parking on a slightly sloped surface by selecting only a slight displacement of the lever 4 in this case.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A brake actuation device for a vehicle having a brake comprising:
   an electric actuator for activating the brake;
   an electric switch operating element movable between a brake apply position and a brake release position;
   a control unit configured to control the actuator according to the position of the switch; and
   a locking device configured to lock the switch in the brake apply position, wherein the locking device is controlled by the control unit.

2. The brake actuation device according to claim 1, wherein the control unit is configured to move the switch from the locked brake apply position to the brake release position when the actuator has failed to tighten the brake.

3. The brake actuation device according to claim 1, wherein the control unit is configured to lock the switch in the brake apply position after the actuator has tightened the brake.

4. The brake actuation device according to claim 1, further comprising a return element operable to push the switch in the direction of the brake release position.

5. The brake actuation device according to claim 1, wherein the return element comprises a return spring.

6. The brake actuation device according to claim 1, wherein the switch is configured to be manually undone when locked by the locking device.

7. The brake actuation device according to claim 6, wherein the locking device comprises a brake pad, which when locked, frictionally abuts against the switch.

8. The brake actuation device according to claim 6, wherein the switch is configured to be moved by the locking device.

9. The brake actuation device according to claim 1, wherein the switch comprises a lever rotatable around an axis between the brake apply position and the brake release position.

10. The brake actuation device according to claim 9, wherein the switch is moved in response to locking the switch.

11. The brake actuation device according to claim 9, further comprising a plate, wherein the lever is embedded into the plate, the lever having a flank which aligns with the plate in one of the brake apply position or the brake release position.

12. The brake actuation device according to claim 11, wherein a trough is molded into the plate and accommodates the lever, the trough extending beyond an axial end of the lever.

13. The brake actuation device according to claim 12, wherein the trough has a width in the axial direction that does not exceed 4 cm.

14. The brake actuation device according to claim 9, wherein the lever is arranged on a center console of the vehicle.

15. The brake actuation device according to claim 14, wherein the lever is eccentrically arranged on the center console and a second operating element is provided next to the lever.

16. The brake actuation device according to claim 15, wherein the lever is eccentrically arranged on the center console and a storage compartment is provided next to the lever.

* * * * *